United States Patent
Hooks

(10) Patent No.: US 7,260,615 B2
(45) Date of Patent: Aug. 21, 2007

(54) APPARATUS AND METHOD FOR ANALYZING REMOTE DATA

(75) Inventor: Charles Gordon Hooks, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 10/313,327

(22) Filed: Dec. 5, 2002

(65) Prior Publication Data

US 2004/0111487 A1  Jun. 10, 2004

(51) Int. Cl.
*G06F 15/16* (2006.01)

(52) U.S. Cl. .............. 709/217; 709/200; 709/201

(58) Field of Classification Search .......... 709/217
See application file for complete search history.

(56) References Cited

U.S. PATENT DOCUMENTS

| | | | | |
|---|---|---|---|---|
| 4,887,204 A | | 12/1989 | Johnson et al. ............. | 364/200 |
| 5,742,829 A | * | 4/1998 | Davis et al. ................. | 717/178 |
| 6,115,747 A | | 9/2000 | Billings et al. ............. | 709/231 |
| 6,243,738 B1 | | 6/2001 | Hayles et al. ............... | 709/203 |
| 6,347,398 B1 | * | 2/2002 | Parthasarathy et al. ..... | 717/178 |
| 6,493,871 B1 | * | 12/2002 | Welch et al. ................ | 717/173 |
| 6,802,061 B1 | * | 10/2004 | Partovi et al. .............. | 717/173 |
| 2002/0055948 A1 | * | 5/2002 | Breuer et al. ............... | 707/500 |
| 2002/0112232 A1 | * | 8/2002 | Ream et al. ................. | 717/176 |
| 2003/0110467 A1 | * | 6/2003 | Balakrishnan .............. | 717/104 |

* cited by examiner

*Primary Examiner*—Rupal Dharia
*Assistant Examiner*—Nicholas R Taylor
(74) *Attorney, Agent, or Firm*—David A. Mims, Jr.; Rudolf O. Siegesmund; Gordon & Rees, LLP

(57) ABSTRACT

An apparatus and method for processing remotely located data is disclosed. The present invention comprises a computer software program that operates on a local machine and a remote machine. A user must first select a module to execute and specify the remote data. The local machine creates a temporary directory on the remote machine and copies a control script into the temporary directory. The control script copies the module from the local system to the remote system and executes the module. The module generates an output and transmits the output back to the local machine. The control script then deletes the module on the remote system. The control script also deletes the temporary directory and the control script on the remote system, leaving the remote data in the same condition as it was prior to analysis.

28 Claims, 1 Drawing Sheet

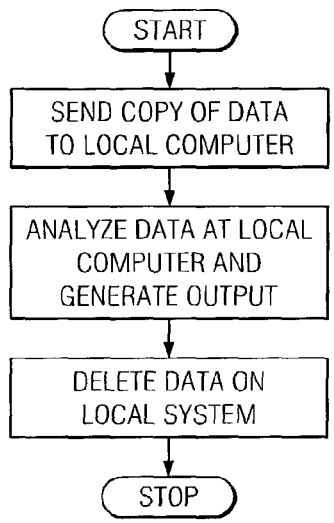
FIG. 1
*(PRIOR ART)*
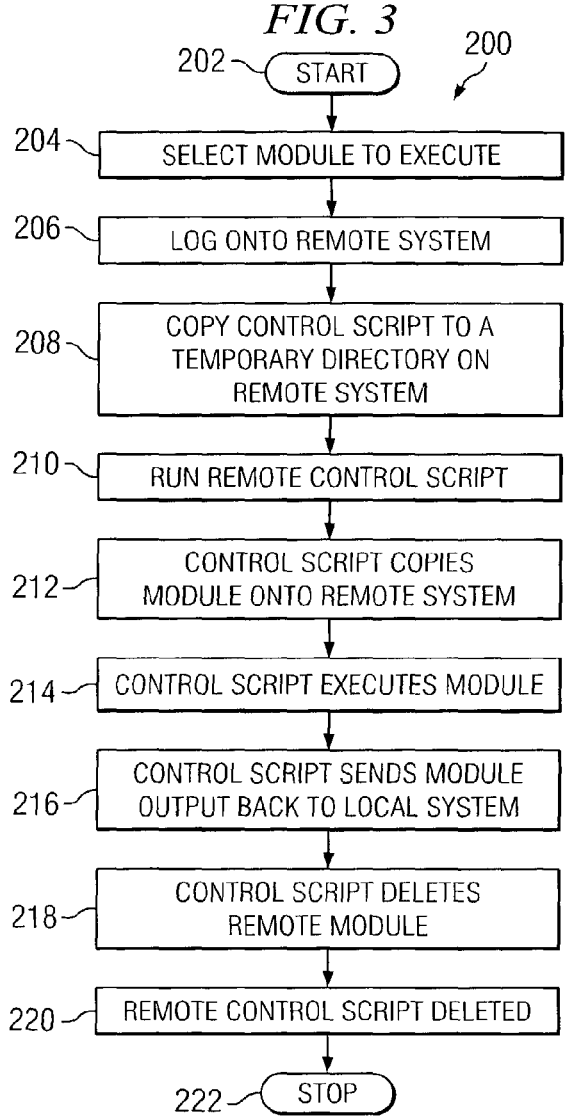
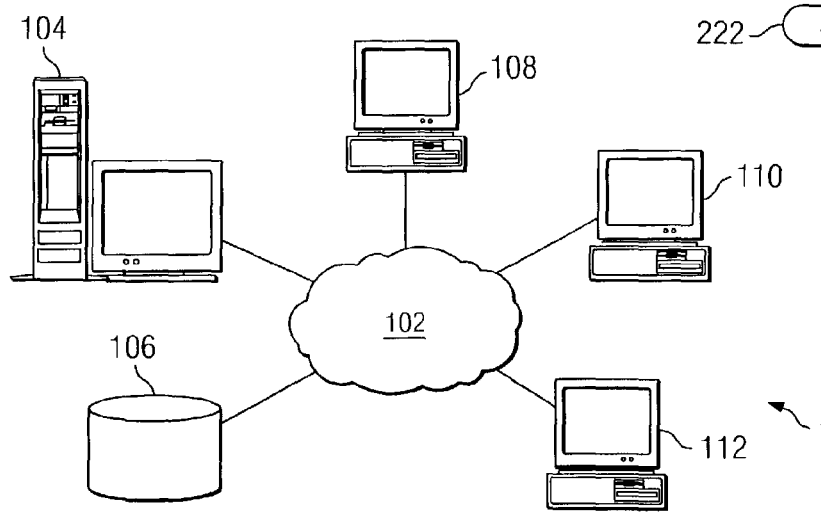

APPARATUS AND METHOD FOR ANALYZING REMOTE DATA

FIELD OF THE INVENTION

The present invention is related to methods of processing large amounts of remotely located data by computers.

BACKGROUND OF THE INVENTION

It is common in the art for a local computer to contain a software application or module which analyzes data located on a remote system. The data is usually very large, on the order of several gigabytes, possibly even several terabytes. Some databases are larger still. The prior art method for analyzing the remote data is to copy the data from the remote location to the local machine for processing by the module. The module then executes and generates some type of output such as a spreadsheet or a report. The data is then deleted from the local system and the user views the output. FIG. 1 is an illustration of the prior art method of analyzing data at a remote location.

Unfortunately, the development of storage capacity has outpaced the development of transmission capacity in recent years. In other words, as the technology in both fields has progressed, it has taken longer for the data to be transmitted from the remote machine to the local machine for analysis. The phenomenon has forced companies to develop various methods for analyzing data at the remote location as opposed to the local machine. U.S. Pat. No. 4,887,204 entitled "System and Method for Accessing Remote Files in a Distributed Networking Environment" discloses a method of accessing remote files by labeling each file with a synchronization mode based on the characteristics of the file. The synchronization modes are then assigned to one of two nodes. The local machine accesses the remote files using the two nodes and the transmission rate between the remote machine and the local machine is increased as compared to more traditional means of file transfer. What is needed beyond the '204 patent is a more efficient method of analyzing data at a remote site.

U.S. Pat. No. 6,115,747 entitled "Computer Network Interface That Merges Remote Data Received From Other Computers With Local Data Before Transmitting the Merged Data to a Network" discloses a method of combining data packets from a first computer with data packets from a second computer and transmitting the combined data packets to a third computer. What is needed beyond the '747 patent is a more efficient method of analyzing data at a remote site.

U.S. Pat. No. 6,243,738 entitled "Data Acquisition System Which Includes Remote Access to Data Acquisition Devices" discloses a method of accessing files on a remote machine utilizing a data acquisition program. The data acquisition program queries the remote computer for the specific files. What is needed beyond the '738 patent is a more efficient method of analyzing data at a remote site.

Consequently, a need exists for a more efficient apparatus and method of analyzing data stored at a remote location. Furthermore, a need exists for an apparatus and method for processing the data that concentrates the processing at the remote location and minimizes the amount of data transmitted over the network connections. A need also exists for an apparatus and method that will accomplish these objectives while leaving the remote data in the same condition as the data was in prior to processing.

SUMMARY OF THE INVENTION

An apparatus and method for processing remotely located data is disclosed. The present invention comprises a computer software program that operates on a local machine and a remote machine. A user must first select a module to execute and specify the remote data. The local machine creates a temporary directory on the remote machine and copies a control script into the temporary directory. The control script copies the module from the local system to the remote system and executes the module. The module generates an output and transmits the output back to the local machine. The control script then deletes the module on the remote system. The control script also deletes the temporary directory and the control script on the remote system, leaving the remote data in the same condition as it was prior to analysis.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an illustration of the prior art method of analyzing data at a remote site;

FIG. 2 is a illustration of a computer network associated with the present invention; and FIG. 3 is an illustration of the method of the present invention.

DETAILED DESCRIPTION OF THE PREFERRED EMBODIMENT

As used herein, the term computer means any digital or analog processing device capable of running an algorithm or software program. The terms computer, machine, and system are used interchangeably. As used herein, the term application means a program designed to assist in the performance of a specific task, such as word processing, accounting, or inventory management. The term application also includes a program designed to perform a particular function; that is software that solves narrowly focused problems or those related to computer system management. The terms application, software, and module are all used interchangeably.

FIG. 2 is an illustration of computer network 100 associated with the present invention. Computer network 100 comprises local machine 108 electrically coupled to network 102. Local machine 108 is electrically coupled to remote machine 110 and remote machine 112 via network 102. Local machine 108 is also electrically coupled to server 104 and database 106 via network 102. Network 102 may be a simplified network connection such as a local area network (LAN) or may be a larger network such as a wide area network (WAN) or the Internet. Furthermore, computer network 100 depicted in FIG. 2 is intended as a representation of all possible operating systems that may contain the present invention and is not meant as an architectural limitation.

The present invention is intended to operate between two machines, depicted as local machine 108 and remote machine 112. Alternatively, either local machine 108 or remote machine 112 can be another computer network comprising a plurality of computers. However, these are only two examples of configurations of machines and are not meant as a limitation as the present invention is operable on any combination of two machines.

FIG. 3 is an illustration of the method of the present invention, remote data processing program 200, which operates on both local machine 108 and remote machine 112 illustrated in FIG. 2. Remote data processing program 200 starts (202) when the user at the local machine selects a module to execute on the remote machine (204). In selecting the module, the user has the option of running remote data processing program 200 on demand or on a user designated schedule. Furthermore, the user can designate data processing program 200 to run at low priority on the remote system such that the normal processes of the remote system are not interrupted. If the user is running data processing programs 200 on a plurality of remote systems, then the user may also select different modules for the different remote systems. In this manner, the modules can be varied by remote location.

The user then logs onto the remote system (206). Alternatively, remote data processing program 200 can automatically log onto the remote machine specified by the user, eliminating the need for the user to do so. Remote data processing program 200 then creates a temporary directory on the remote system and copies the control script for the module into the temporary directory (208). The user then runs the control script on the remote system (210). The control script copies the selected module from the local system to the remote system (212). The control script then executes the module (214). Executing the module will cause the module to run on the remote machine as if it was on the local machine and the data was on the local machine. The module accesses and analyzes the data, obtaining an output. The output may be as simple as a one word or number answer, or may be more complex, such as a report, spreadsheet, or another database. Regardless of the nature of the output, the control script sends the output back to the local machine (216). The control script then deletes the module from the remote system (218). The control script also deletes itself and the temporary directory from the remote system (220) and the remote data processing program 200 ends (222).

The present invention is preferable over the prior art because it decreases the overall processing time associated with a module. The decreased processing time is a result of two factors. First, the amount of information transmitted over the network communication lines is decreased. In the prior art, the data or some modified version of the data is transmitted over the network communication lines to the local machine. Because the data is so very large and the bandwidth of the communication lines is limited, the transmission of data from one site to another is a time intensive process. By transmitting the module to the remote machine and analyzing the data at the remote location and transmitting only the output back to the local machine, the total amount of data transmitted between the two machines is greatly reduced.

Secondly, the overall processing time associated with the module is decreased because the present invention allows the module to run on an increased number of central processing units (CPUs) and an increased amount of random access memory (RAM). By running the application at the remote machines instead of the local machine, the resources (CPU and RAM) of the remote machine are utilized rather than the resources of the local machine. This leaves the resources of the local machine free to analyze other data, or preferably, run the present invention on a second remote machine. The effect of the decreased processing time is greatly enhanced when the present invention is employed on a plurality of remote machines because the modules utilize the resources of the plurality of remote machines as opposed to the resources of the single local machine. The use of the remote machine can be controlled by setting the executing priority of the module low so as not to interfere with the normal processing of the remote machine.

The present invention is also preferable over the prior art because the present invention leaves the remote data in the same condition as the remote data was in prior to analysis. This is preferable because the data can then be used by other modules and applications on the local machine, the remote machine, or a third machine.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A computer implemented method comprising:
   creating a temporary directory on a remote system having a data;
   copying a control script to said temporary directory;
   running said control script on the remote system;
   wherein said control script copies a module from a local system to said remote system;
   wherein said control script executes the module;
   wherein, responsive to said control script executing the module, said module accesses and analyzes the data to generate an output;
   wherein said control script sends said output to said local system;
   wherein executing the module causes the module to run on the remote system and perform an operation on the data, as if the module was running on the local system, without the need for an abstract, object-oriented representation of the data that is independent of a data storage schema of the data; and
   wherein the output does not involve sending software or software updates from the remote system to be installed on the local system.

2. The method of claim 1 further comprising user selection of said module and logging onto a remote system.

3. The method of claim 1 wherein said control script executes said module.

4. The method of claim 1 wherein said module analyzes data stored on said remote system.

5. The method of claim 1 wherein said control script deletes said module from said remote system.

6. The method of claim 1 wherein said control script deletes said temporary directory.

7. The method of claim 1 wherein said output is a report.

8. The method of claim 1 wherein said output is a spreadsheet.

9. The method of claim 1 wherein said local system is a computer.

10. The method of claim 1 wherein said local system is a computer network.

11. The method of claim 1 wherein said remote system is a computer.

12. The method of claim 1 wherein said remote system is a computer network.

13. The method of claim 1 wherein said module uses the resources of said remote system.

14. The method of claim 1 wherein said module running on said remote system does not interfere with the normal operation of said remote system.

15. An apparatus comprising:
   hardware comprising a processor and a memory;
   a software electronically written onto said memory;
   wherein said software directs said processor to perform steps comprising:
      creating a temporary directory on a remote system having a data;
      copying a control script to said temporary directory;
      running said control script on the remote system;
      wherein said control script copies a module from a local system to said remote system;
      wherein said control script executes the module;
      wherein, responsive to said control script executing the module, said module accesses and analyzes the data to generate an output;
      wherein said control script sends said output to said local system;
      wherein said module generates an output on the remote system as if the module was running on the local system without the need for an abstract, object-oriented representation of a data that is independent of a data storage schema of the data; and
      wherein the output does not involve sending software or software undates from the remote system to be installed on the local system.

16. The apparatus of claim 15 further comprising user selection of said module and logging onto a remote system.

17. The apparatus of claim 15 wherein said control script executes said module.

18. The apparatus of claim 15 wherein said module analyzes data stored on said remote system.

19. The apparatus of claim 15 wherein said control script deletes said module from said remote system.

20. The apparatus of claim 15 wherein said control script deletes said temporary directory.

21. The apparatus of claim 15 wherein said output is a report.

22. The apparatus of claim 15 wherein said output is a spreadsheet.

23. The apparatus of claim 15 wherein said local system is a computer.

24. The apparatus of claim 15 wherein said local system is a computer network.

25. The apparatus of claim 15 wherein said remote system is a computer.

26. The apparatus of claim 15 wherein said remote system is a computer network.

27. The apparatus of claim 15 wherein said module uses the resources of said remote system.

28. The apparatus of claim 15 wherein said module running on said remote system does not interfere with the normal operation of said remote system.

* * * * *